Patented May 20, 1952

2,597,492

UNITED STATES PATENT OFFICE 2,597,492

CATION-EXCHANGE POLYMERS OF VINYLANISOLE

Jesse C. H. Hwa, Philadelphia, Pa., assignor to Rohm & Haas Company, Philadelphia, Pa., a corporation of Delaware No Drawing. Application May 12, 1951, Serial No. 226,096

6 Claims. (Cl. 210—24)

1

This invention relates to cation-exchange polymers and to their preparation and use. It relates to insoluble cation-exchange resins of the sulfonic type which are proliferous polymers and which are characterized by unusually large areas of surface, very high degrees of porosity, high adsorption-capacity and very rapid rates of adsorption. More specifically it relates to the preparation and use of resins which have the chemical properties of sulfonic cation-exchangers and the physical properties of popcorn or proliferous polymers. As a result of their peculiar combination of chemical and physical properties these ion-exchange resins have distinct advantages in many applications over the denser, harder sulfonic exchangers employed heretofore, such as those described in U. S. Patents 2,195,196; 2,228,159; 2,228,160 and 2,366,007. They are particularly suitable for use in catalysis, in the demineralization of non-aqueous fluids, and in the adsorption of cationic materials of very high molecular weight. They can be used batch-wise or conventional column operation.

The products of this invention are made by first proliferously polymerizing o-vinylanisole, p-vinylanisole or mixtures of the two and then sulfonating the resultant proliferous polymer. Surprisingly, the step of sulfonating the proliferous or popcorn polymer does not destroy or significantly change its physical form despite the harsh treatment with sulfonating agents—particularly sulfuric acid—and despite the chemical change which takes place.

The proliferous polymers of vinylanisole, from which the cation-exchange resins of this invention are made, are themselves prepared most conveniently by maintaining at a temperature from about 50° C. to 100° C.—and preferably from 60° C. to 80° C.—a mixture of vinylanisole and an auxiliary polyolefinic compound which is co-polymerizable with the vinylanisole and in which the olefinic linkages are in the acyclic portion of the molecule and are the sole functional groups which take part in the copolymerization reaction. It is suggested that the copolymerization be carried out in a closed system where the amount of oxygen is negligible. It is even better to conduct the copolymerization in an inert atmosphere because oxygen exerts an inhibiting effect on the formation of the proliferous product. The addition of a small but catalytic amount of a previously prepared proliferous polymer is also recommended since it serves as a seed from which the proliferous polymer grows rapidly.

Proliferous polymers or copolymers of vinyl-

2 anisole are believed to be new, although other kinds of proliferous polymers have been known for some time. Thus Kondakow (J. prakt. Chim. [2] 64, p. 109 (1901); Carothers (J. A. C. S. 53, p. 4203 (1931)); Staudinger et al. (Berichte 68, p. 1618 (1935)); Britton (U. S. Pat. 2,341,175 of February 2, 1944); Kharasch et al. (Ind. Eng. Chem. 39, p. 830 (1947)) and others have described various popcorn or proliferous polymers from other unsaturated, monomeric materials. Such popcorn polymers are distinct kinds of polymers and they have a community of physical properties. They are opaque, they have a sponge-like, porous structure, and they are insoluble in the very solvents which dissolve the homogeneous, thermoplastic polymers which are normally made from the same monomers. In most cases they look very much like popcorn and have been variously described as sponge-like, cauliflower-like, and coral-like. They have extremely high molecular weights and are apparently cross-linked to some extent. In addition, they are formed by an auto-catalyzed polymerization and the characteristic way in which they form helps to identify them. In the process of preparing popcorn polymers the induction period may be long but once polymerization has started it proceeds rapidly until all or most of the monomer is consumed. It is characteristic of this type of polymerization that the polymer is insoluble in the monomeric material at all stages of the polymerization and that polymerization progresses in random directions with the formation of a branched or clustered, expanded or "popped" product. That is, polymerization progresses by proliferation with the rapid and repeated production of new parts; and for this reason the term "proliferous polymer," which has been applied to this kind of polymer and which is now synonymous with "popcorn polymer," is particularly apt—and is truly descriptive.

This invention relates primarily to the preparation of proliferous polymers of vinylanisole and to their conversion to cation-exchange resins which retain the physical properties of the proliferously polymerized vinylanisole from which they are made. This is not to say, however, that the non-proliferous, clear, cross-linked polymers of vinylanisole cannot also be converted to cation-exchange resins by sulfonation. They can be. But they do not give rise to resins with as large surface areas, or as rapid rates of adsorption, or as high capacities per unit of weight as are obtained from the proliferous polymers. As a matter of fact, some of the clear, non-proliferous polymer is frequently formed together with the proliferous polymer; and while this can be separated, it does not have to be, since it reacts chemically like the proliferous polymer and its presence merely dilutes, as it were, the advantages of the proliferous polymer.

In general, low temperatures favor the formation of proliferous polymers whereas higher temperatures favor the formation of the clear polymers. For this reason it is preferred that the polymerization of vinylanisole be carried out at temperatures from about 50° C. to 80° C. In this range the rate of formation of the proliferous polymer is fast enough to be practical while the formation of the clear, non-proliferous polymer is negligible—particularly in view of what was discussed above. At temperatures from 80° C. to 100° C. the proportion of clear polymer increases at the expense of the proliferous product and above 100° C. the clear product forms to the complete exclusion of the proliferous resin.

A wide variety of polyolefinic compounds, as described above, definitely assist in the formation of the popcorn polymers of vinylanisole. The auxiliary compounds function as popping agents. Examples of some of the best auxiliary agents include divinylbenzene, isoprene, butadiene, bimethallyl, biallyl, trivinylbenzene, dicyclopentadiene, and similar polyolefinic hydrocarbons. Also effective are other unsaturated compounds such as dimethallyl ether and sulfide, vinyl allyl ether and those unsaturated esters, such as diallyl maleate and 2-chloroallyl crotonate, which are disclosed in U. S. Patents Nos. 2,311,615 and 2,341,175. The auxiliary compounds copolymerize with the vinylanisole and consequently are present in the final copolymeric products.

The most satisfactory and suggested amounts of auxiliary compounds are from 2% to 30%, based on the weight of this material and of the vinylanisole. The use of larger amounts has been studied but there does not appear to be any advantage in exceeding 30%—or even 20%—particularly when the ion-adsorbing capacity of the final product is considered. While all of the auxiliary compounds are alike in having a plurality of non-benzenoid, olefinic linkages or double bonds in their chemical structure, and in facilitating the popping of vinylanisole, it is also true that these compounds differ in degree in regard to the effect they have on the density and porosity of the final copolymer. For example, divinylbenzene, which is recognized as a particularly fast and efficient cross-linking agent for vinyl compounds in general, aids very materially in the popping of vinylanisole, but it also gives rise to harder, less porous popcorn polymers than do many of the other auxiliary agents such as butadiene or isoprene. Consequently the amount, within the limits set forth above, of the auxiliary copolymerizable compound which is employed is determined by the degree of porosity or extent of surface-area which is desired in the final product.

The use of a seed to promote the proliferous polymerization is not necessary but is most desirable. The material which is used as a seed can have the same chemical composition as the proliferous polymer which it is desired to make or it can have a different chemical composition. A convenient method involves adding a small amount of a previous batch of proliferous polymer to subsequent mixtures of monomeric material which are to be popped. Even the quantities of one batch which may adhere to the equipment serve to seed subsequent batches. The word "seed" is used herein in the accepted chemical sense and itself indicates that the amount required is very small and that the material is insoluble in the reaction mixture. As little as about 0.001%, on a weight basis, is adequate.

Vinylanisol can be made to polymerize proliferously in bulk or in solution or while suspended in an immiscible liquid medium. The advantage of carrying out the polymerization by the suspension technique is that the final product is obtained in the form of discrete particles which adsorb ions unusually rapidly and which, although small, possess the advantageous properties of popcorn polymers such as porosity, high surface area and rapid rates of adsorption.

It appears that free radicals, such as are provided by peroxidic compounds, play a part in the formation of the opaque, proliferous polymers, just as they do in the formation of clear, glass-like polymers. In proliferous polymerization, however, the amount of the peroxidic compounds, such as benzoyl, lauroyl, stearoyl peroxides, tert.-butyl hydroperoxide and the inorganic per-salts, which can be tolerated is relatively very low and should not exceed 0.5% on a weight basis because large amounts of such compounds favor the formation of the clear, glass-like polymers at the expense of the opaque, proliferous polymers. In like manner, a steady and continuous source of oxygen is to be avoided. That is to say, oxygen should be eliminated and, although the amount of air which is normally present in a closed reaction vessel is not too objectionable, it can be replaced to good advantage by an inert gas such as nitrogen. Thus, it is most desirable to conduct the proliferous polymerization in the substantially complete absence of oxygen.

The proliferous polymers of vinylanisole are next subjected to sulfonation in order to produce the cation-adsorbing polymers of this invention. The polymers are sulfonated by means of sulfonating agents such as sulfur trioxide, concentrated sulfuric acid, chlorosulfonic acid, fuming sulfuric acid and the like. The rate of sulfonation increases as the temperature is raised. Temperatures from about 40° C. to about 80° C. are recommended, together with the use of an excess of the sulfonating agent.

The sulfonate groups, however few, which are attached to the aryl nuclei of the proliferous polymer will exchange cations. But from practical considerations, it is most desirable that at least half of the aromatic nuclei contain at least one sulfonate group so that the product will have a reasonable capacity for adsorbing cations. Actually the preferred product contains from one to two sulfonate groups per aryl nucleus in the proliferous polymer. This number can be added readily in the way described above.

After sulfonation is complete the product is washed thoroughly with water to remove the unreacted sulfonating agent. The cation-adsorbing polymer is then in the acid or hydrogen form but it can be readily converted into the salt form by treatment with an excess of a soluble salt, the cations of which salt are thereby exchanged for the hydrogen atoms of the polymer. Conversion of the polymer from one form to another, including regeneration, merely requires treatment of the polymer with a solution containing an excess of the cationic material which it is desired to combine with the polymer.

The following examples, in which all parts are by weight, are presented in order that the preparation and properties of the products of this invention may be thoroughly understood and recognized. The examples are not to be taken, however, as limiting this invention.

EXAMPLE 1

This serves to show how monomeric vinylanisole can be conveniently converted into proliferous or popcorn polymers. In each case a glass tube was partially filled with the mixture of vinylanisole to be popped. A small piece—a seed—of a previously prepared proliferous copolymer of approximately 90% vinylanisole and 10% isoprene was added. The mixtures contained a major portion of vinylanisole and a minor portion of a polyolefinic, auxiliary compound, as a popping agent which was known to be copolymerizable with the vinylanisole. Nitrogen was bubbled through the mixtures in order to flush oxygen from the tubes and thereafter the tubes were sealed with foil-lined caps and were placed in a constant-temperature waterbath. The kinds and amounts of the auxiliary popping agents which copolymerized proliferously with the vinylanisole are listed below in Table I together with other pertinent data. The percentages of the components of the mixture are based on the total weight of the copolymerizable mixtures. An induction period, as recorded, is that length of time during which no visible change takes place in the monomeric mixture and is followed by a period of propagation during which the polymer is formed on the seed by proliferation. Ordinarily the induction period is several times as long as the period of propagation.

*Table I*

| Auxiliary Compound | Benzoyl Peroxide | Temperature | Induction Period |
|---|---|---|---|
|  | Per Cent | °C. |  |
| 10% Butadiene | 0 | 65 | About 1 day. |
| Do | 0.1 | 50 | 1 to 2 days. |
| 20% Butadiene | 0 | 65 | About 1 day. |
| 10% Isoprene | 0 | 65 | About 3 days. |
| 6% Commercial Divinylbenzene.[1] | 0.05 | 65 | 1 to 2 days. |
| 10% Butadiene and 6% Commercial Divinylbenzene.[1] | 0.05 | 65 | About 1 day. |

[1] The commercial divinylbenzene contained approximately 44% divinylbenzene and 56% ethylstyrene.

EXAMPLE 2

A proliferous copolymer of 90% vinylanisole and 10% butadiene was sulfonated as follows: A mixture of 10 parts of the copolymer (the first described in Example 1 above) and 200 parts of 98% sulfuric acid was stirred and heated at 45°–50° C. for 10 minutes. The mixture was cooled to room temperature and was filtered. The copolymeric material was washed free of acid with water and was dried overnight in an oven at 65° C. The product, on analysis, was found to contain 13.1% sulfur as against a theoretical sulfur-content of 14.0%, calculated on the basis of one sulfonic acid group for each aromatic nucleus in the copolymer. The resin was extremely porous, and when soaked in water it swelled to 25 times its original volume. It readily exchanged its hydrogen ions for sodium when it was treated with an excess of a 5% aqueous solution of sodium chloride and thereafter was readily convertible to the acid form by treatment with an excess of a 4% aqueous solution of sulfuric acid. It had an exchange-capacity of 3.73 milliequivalents per gram.

Due to its great tendency to swell on immersion in water, this resin was not adapted for use in commercial column-operation, although it was suitable for use in batch-operation due to its capacity for exchanging cations at a very rapid rate. A resin which was suitable for continuous use in conventional ion-exchange columns was made by sulfonating for one hour at 60°–70° C. in the manner described above, a proliferous copolymer of 85% vinylanisole, 10% butadiene and 5% commercial divinylbenzene (containing approximately 44% divinylbenzene and 56% ethylstyrene). The resin had a characteristic popcorn structure and also had a capacity of 3.4 milliequivalents per gram.

I claim:

1. As a new composition of matter, a sulfonated, opaque, proliferous polymer containing at least 70% proliferously polymerized vinylanisole, said sulfonated polymer being capable of exchanging cations.

2. As a new composition of matter, a sulfonated, proliferous copolymer of a mixture of (a) vinylanisole and (b) a polyolefinic organic compound in which the olefinic linkages are in the acyclic portion of the molecule and are the reactive groups which enter into the proliferous copolymerization, said copolymer containing at least 70% proliferously copolymerized vinylanisole and being capable of exchanging cations.

3. The process of removing cations from fluids containing said cations which comprises bringing said fluids in contact with the composition of claim 1.

4. As a new composition of matter, a sulfonated copolymer of a mixture of vinylanisole and butadiene, said copolymer containing at least 70% proliferously copolymerized vinylanisole and being capable of exchanging cations.

5. As a new composition of matter, a sulfonated copolymer of a mixture of vinylanisole and isoprene, said copolymer containing at least 70% proliferously copolymerized vinylanisole and being capable of exchanging cations.

6. As a new composition of matter, a sulfonated copolymer of a mixture of vinylanisole and divinylbenzene, said copolymer containing at least 70% proliferously copolymerized vinylanisole and being capable of exchanging cations.

JESSE C. H. HWA.

No references cited.